US006501069B2

(12) United States Patent
Blasing

(10) Patent No.: US 6,501,069 B2
(45) Date of Patent: Dec. 31, 2002

(54) OPTOELECTRONIC ANGLE OF ROTATION SENSOR HAVING A CODE DISK WITH REDUNDANT DIGITAL CODING

(75) Inventor: Frank Blasing, Werl (DE)

(73) Assignee: Leopold Kostal GmbH & Co., Ludenscheid (DE)

(*) Notice: Subject to any disclaimer, the term of this patent is extended or adjusted under 35 U.S.C. 154(b) by 0 days.

(21) Appl. No.: 10/097,793

(22) Filed: Mar. 14, 2002

(65) Prior Publication Data

US 2002/0134926 A1 Sep. 26, 2002

Related U.S. Application Data

(63) Continuation of application No. PCT/EP00/08931, filed on Sep. 13, 2000.

(30) Foreign Application Priority Data

Sep. 14, 1999 (DE) .......................................... 199 44 005

(51) Int. Cl.$^7$ .............................................. G01D 5/347
(52) U.S. Cl. .......................... 250/231.18; 250/237 R; 341/13
(58) Field of Search ....................... 250/231.13, 231.14, 250/231.16, 231.18, 237 G, 237 R; 341/11, 13, 31

(56) References Cited

U.S. PATENT DOCUMENTS 5,418,362 A 5/1995 Lusby et al.
6,124,588 A * 9/2000 Hagl et al. ............. 250/231.14

FOREIGN PATENT DOCUMENTS

DE 40 22 837 A1 1/1992
EP 0 654 652 A1 1/1994

* cited by examiner

Primary Examiner—Stephone B. Allen
Assistant Examiner—Bradford Hill
(74) Attorney, Agent, or Firm—Brooks & Kushman, P.C.

(57) ABSTRACT

A sensor for determining the angular position of a device includes a code disk and a sensor array. The code disk moves in a movement direction in response to rotational movement of the device. The code disk has a digital code including two sets of code tracks extending along the length of the code disk. The corresponding tracks of each track set are spaced apart from one another across the width of the code disk. The sensor array is arranged adjacent to one side of the code disk and across the width of the code disk for sensing the tracks as the other side of the code disk is illuminated to determine the angular position of the device. The sensor provides a reliable indication of the angular position of the device if the digital code is partially contaminated with debris as the digital code contains two sets of corresponding tracks.

12 Claims, 2 Drawing Sheets

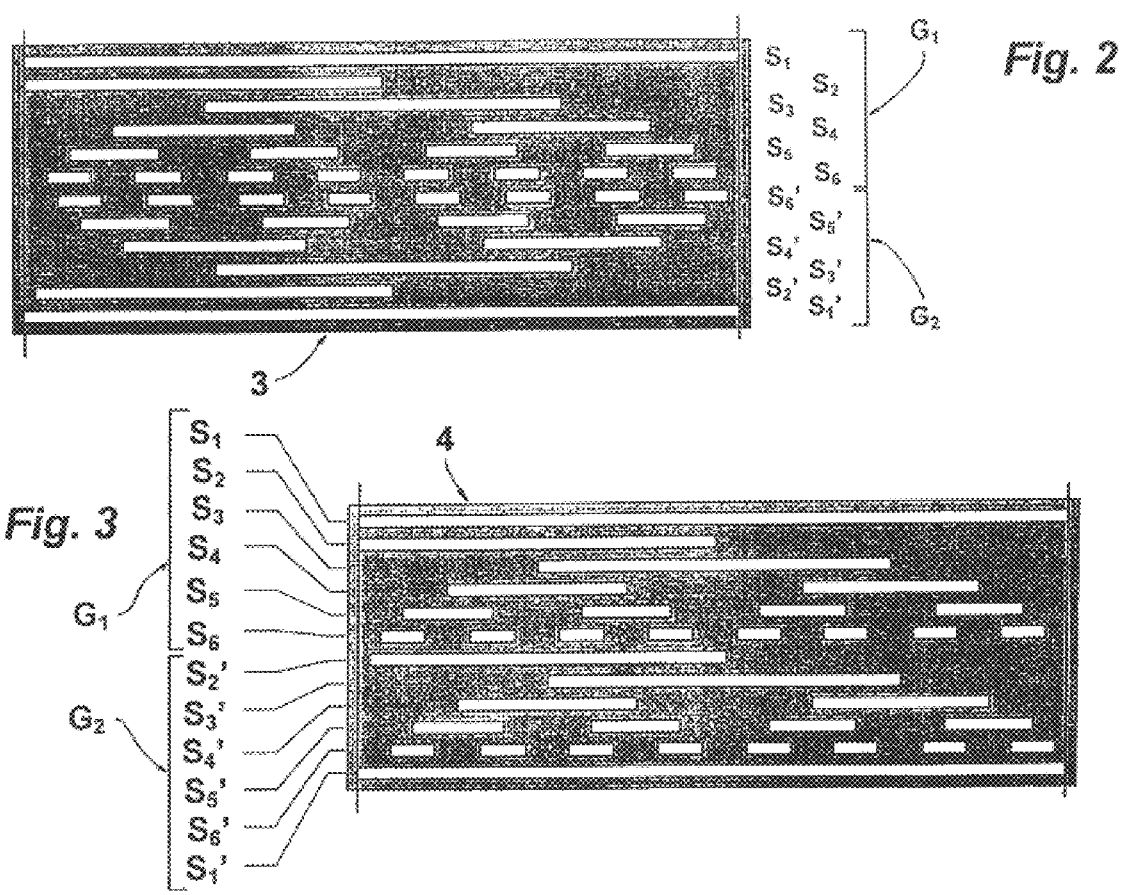

OPTOELECTRONIC ANGLE OF ROTATION SENSOR HAVING A CODE DISK WITH REDUNDANT DIGITAL CODING

CROSS-REFERENCE TO RELATED APPLICATIONS

This is a continuation of International Application PCT/EP00/08931, published in German with an international filing date of Sep. 13, 2000.

BACKGROUND OF THE INVENTION

1. Field of the Invention

The present invention relates to an angle of rotation sensor such as a steering angle sensor. More particularly, the present invention relates to an optoelectronic angle of rotation sensor having an illuminated code disk carrying a multi-track digital code and being coupled to the rotational movement of a rotor, and having a sensor array for scanning the multi-track digital code on the code disk. The sensor array having a plurality of individual transducer elements and being arranged transverse to the moving direction of the code disk with respect to the longitudinal direction of the sensor array.

2. Background Art

Angle of rotation sensors are frequently used for realizing automatic positioning and measuring processes in machine tools and coordinate measuring systems. In addition, angle of rotation sensors are used in the automotive industry for determining the absolute angular position of a steering wheel. Such angle of rotation sensors are referred to as steering angle sensors.

In motor vehicles, a value indicative of the steering angle is required for influencing a dynamic control system with this value. In addition to the steering angle information, a dynamic control system receives other measuring data, for example, the rotational speed of the wheels or the rotation of the motor vehicle about its vertical axis. The dynamic control system evaluates the absolute steering angle, as well as the steering speed, together with other measuring data in order to control actuators, such as brakes, and/or for engine management.

DE 40 22 837 A1 discloses an optoelectronic steering angle sensor having a light source and a line sensor arranged parallel to one another and spaced apart from one another. A code disk is arranged between the light source and the line sensor. The code disk is connected to the steering spindle in a rotationally rigid fashion. The line sensor is a charge coupled device (CCD) line sensor having a plurality of individual transducer elements. The code disk carries a code having a light slot that is realized in the form of an Archimedean spiral extending over 360°. Information on the actual steering angle can be obtained from the illumination of corresponding transducer elements of the line sensor at a certain steering deflection.

The Archimedean spiral used as the code has a continuous progression. This means that this code represents an analog code. In this angle of rotation sensor, only a fraction of the transducer elements of the line sensor participate in determining the angular position of the steering wheel. Namely, the transducer elements that are illuminated through the light slot of the analog code. The remaining transducer elements of the line sensor only participate indirectly in the evaluation of the angular information because the non-illuminated transducer elements merely make it possible to ascertain that the angular position of the steering wheel is not situated in the regions represented by these non-illuminated transducer elements.

When using such an analog code realized in the form of a light slot, it is possible for the light slot to become contaminated by debris such as hair. This means that the steering angle can no longer be determined in this code region because the code is sectionally shaded by the contamination. The transducer elements which need to be illuminated in order to determine this angular position remain dark. Consequently, this angular position is not defined.

In addition to the previously described analog code, the contamination problem also occurs with angle of rotation sensors having a digital code in the form of several tracks arranged adjacent to one another. If one or more tracks of the digital code are contaminated in an angular position of the rotor relative to the stator, then this angular position can not be determined with a desired resolution.

SUMMARY OF THE INVENTION

Accordingly, it is an object of the present invention to provide an optoelectronic angle of rotation sensor having a multi-track digital code operable to provide a reliable angle measurement in the event that the digital code is partially contaminated.

The present invention obtains this object and other objects by providing the individual code tracks of a multi-track digital code on the code disk several times with the corresponding individual tracks being spaced apart from one another across the width of digital code transversely with respect to the direction of movement of the code disk.

In the angle of rotation sensor according to the present invention which, in particular, is also suitable as a steering angle sensor for determining the absolute angular position of a steering wheel of a motor vehicle, at least individual code tracks are provided several times in the multi-track digital code of the code disk. Preferably, the code tracks having a particularly high significance with respect to angle-related information are provided several times. In order to lower the statistical probability that the code tracks which are contained in the digital code several times are simultaneously impaired with respect to their function by contaminations in the same position, these code tracks are spaced apart from one another across the digital code transversely with respect to the direction of movement of the code disk. Preferably, other code tracks of the digital code having a lower significance with respect to the angular information contained therein are arranged between the code tracks that are provided several times.

If the code disk of an optoelectronic angle of rotation sensor has a comparatively small width, the present invention proposes that the individual code tracks only have a minimal width. For example, the code tracks have a width such that respective code tracks only illuminate three transducer elements of a sensor array. In comparison, respective code tracks in accordance with the prior art usually have such a width that they illuminate six or more transducer elements. In accordance with the prior art, such a relatively larger width is sensible because it is assumed that a possible contamination does not cause the light to be completely blocked due to the relatively large width of the tracks.

In the angle of rotation sensor according to the present invention, the probability that a code track of the digital code, at least a highly significant code track, is not projected onto the sensor array at all due to a contamination in a certain angular position is substantially reduced because the two identical code tracks are spaced apart from one another. Instead of merely providing individual code tracks several times in the digital code of the code disk, it would also be possible to arrange, for example, all code tracks several times on the code disk twice. If all code tracks are provided several times, all multiple code tracks may be spaced apart from one another by the same distance in order to fulfill the requirement of spacing apart from code tracks that are provided several times. This corresponds to a parallel arrangement of the respective multi-track digital code. It is also possible for code tracks with the same angular information of higher significance to be spaced apart from one another by a larger distance than code tracks with a lower significance with reference to the angle-related information contained in the respective code track.

Because the present invention makes it possible to reduce the width of an individual code track, the code disk of the steering angle sensor according to the present invention does not have to be realized larger than in known systems. This means that a sensor array of customary dimensions, for example, a line sensor, can be used in the angle of rotation sensor according to the present invention.

Because at least individual code tracks are provided several times, it is also possible to place the multiple code tracks offset relative to one another, for example, by one-half bit width measured on the width of the bit with the lowest significance. The resolution of the angle of rotation sensor can be increased in this fashion. It is also possible for this offset to replace a code track such that the required width of the code disk is correspondingly reduced.

BRIEF DESCRIPTION OF THE DRAWINGS

Additional particularly advantageous embodiments of the present invention will be explained using the embodiment examples shown in the drawings.

FIG. 2 illustrates a schematic representation of a second code disk of an optoelectronic angle of rotation sensor in accordance with a second embodiment of the present invention; and FIG. 3 illustrates a schematic representation of a third code disk of an optoelectronic angle of rotation sensor in accordance with a third embodiment of the present invention.

DETAILED DESCRIPTION OF THE PREFERRED EMBODIMENT(S)

Figure 1:
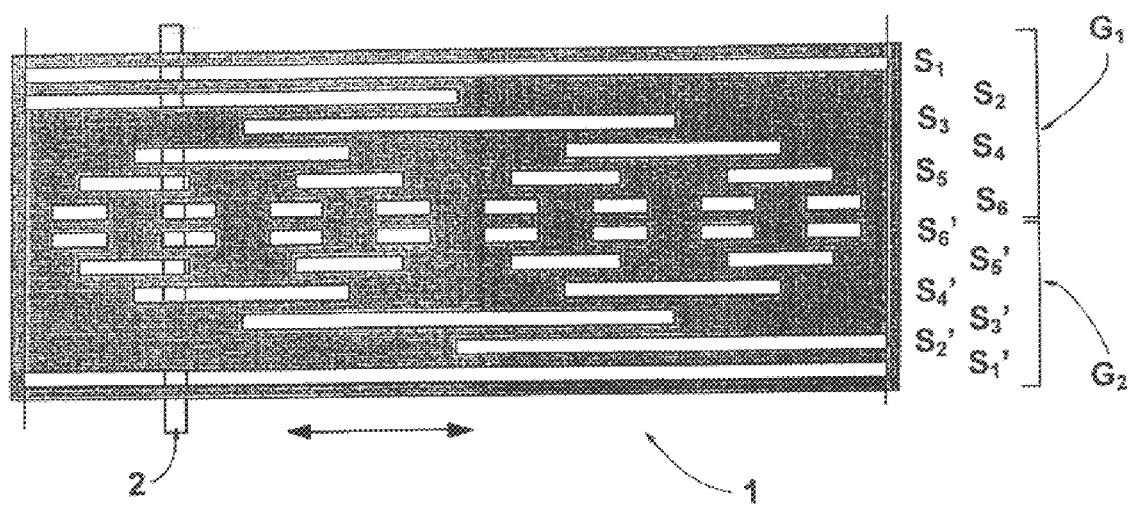
FIG. 1 illustrates a schematic representation of a first code disk of an optoelectronic angle of rotation sensor in accordance with a first embodiment of the present invention.

Referring now to FIG. 1, a code disk 1 in accordance with a first embodiment of the present invention is shown. Code disk 1 is for use in an optoelectronic angle of rotation sensor such as a steering angle sensor for determining the absolute angular position of a steering wheel of a motor vehicle. Code disk 1 is realized in the form of a rectangular disk and is coupled to the rotational movement of a rotor or the like by means of a gear such as a pinion gear. Due to the geared coupling, a rotational movement of the rotor, for example, the steering spindle, results in a translational movement of the code disk as indicated by the double arrow shown in FIG. 1.

An illumination device (not particularly shown) such as a light illuminates one side of code disk 1. A line sensor 2 is arranged opposite the other side of code disk 1 such that the transducer elements of the line sensor point toward the other side of the code disk. Code disk 1 includes a plurality of light slots or code tracks which collectively represent a multi-track digital angular code. In the first embodiment shown in FIG. 1, code disk 1 includes six tracks $S_1$–$S_6$.

In this first embodiment, code disk 1 represents a code section of a longer code disk. This code section forms the entire code by being successively arranged in a row several times along the length of the code disk. Code tracks $S_1$–$S_6$ which can be differentiated from one another by their indexes are numerically arranged in accordance with their significance, wherein code track $S_1$ has the highest significance referred to the angular information contained in this code track, and wherein code track $S_6$ has the lowest significance. In an adjacent code segment, the code track $S_1$ or $S_{1'}$ is realized in an opaque fashion.

Code tracks $S_1$–$S_6$ of the digital code form a track group $G_1$. All tracks $S_1$–$S_6$ of track group $G_1$ are contained in the digital code of code disk 1 a second time. Namely, in the form of track group $G_2$. The individual code tracks of track group $G_2$ are identified by the reference symbols $S_{1'}$–$S_{6'}$, wherein identical indexes identify the same code tracks of track groups $G_1$ and $G_2$. With respect to the arrangement of code tracks $S_1$–$S_6$ and $S_{1'}$–$S_{6'}$, the present invention proposes that code tracks having a higher significance be spaced apart from one another by a larger distance than code tracks having a lower significance. Consequently, code tracks $S_1$, $S_{1'}$ are spaced apart from one another by the largest distance across the width of code disk 1 and code tracks $S_6$, $S_{6'}$ are spaced apart from one another by the smallest distance across the width of the code disk.

FIG. 2 illustrates a code disk 3 in accordance with a second embodiment of the present invention. The digital code of code disk 3 is, in principle, realized analogously to the digital code of code disk 1. Consequently, the individual code tracks of code disk 3, as well as code track groups $G_1$, $G_2$, are identified by corresponding reference symbols. Code track group $G_1$ with code tracks $S_1$–$S_6$ of code disk 3 corresponds to code track group $G_1$ of code disk 1 shown in FIG. 1. Code tracks $S_{1'}$–$S_{6'}$ of code track group $G_2$ of code disk 3 are also realized analogously to the code tracks of code track group $G_2$ of code disk 1, but are arranged offset relative to code tracks $S_1$–$S_6$ of code track group $G_1$ by one-half bit length in contrast to the arrangement on the code disk 1. Due to this measure, the resolution of the angle of rotation sensor is increased by this half bit length.

FIG. 3 illustrates a code disk 4 in accordance with a third embodiment of the present invention. Code tracks $S_1$–$S_6$ of code track group $G_1$ correspond to those code tracks of code track $G_1$ shown in FIGS. 1 and 2. All code tracks $S_{1'}$–$S_{6'}$ of code track group $G_2$ are spaced apart from one another by the same distance as the code tracks of code track group $G_1$ and offset by one-half bit length as in the second embodiment illustrated in FIG. 2. On code disk 4, code tracks $S_1$ and $S_{1'}$ represent reference code tracks in order to make it possible to take into account tolerances in the movement between the code disk and line sensor 2 during the evaluation.

Although the code disk is depicted in the form of a rectangular strip in FIGS. 1, 2, and 3, the code disk may also be realized in the form of a circular disk. The shape illustrated in the FIGS. 1, 2, and 3 then represents a developed view of such a circular disk. In such an instance, the code disk is directly coupled to the rotational movement of a rotor such as a steering spindle. The longitudinal direction of line sensor 2 then extends radially with reference to the axis of rotation of such a code disk.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A sensor for determining the angular position of a device, the sensor comprising:

a code disk operable to be moved in a movement direction in response to rotational movement of a device, the code disk having a digital code including at least two sets of code tracks extending along the movement direction of the code disk, wherein corresponding code tracks of each set of code tracks are spaced apart from one another transversely with respect to the movement direction of the code disk; and a sensor array adjacent to one side of the code disk and arranged transversely to the movement direction of the code disk for sensing the code tracks as the other side of the code disk is illuminated to determine the angular position of the device.

2. The sensor of claim 1 wherein:

the corresponding code tracks of each set of code tracks are arranged offset with one another along the movement direction of the code disk.

3. The sensor of claim 1 wherein:

the corresponding code tracks of each set of code tracks are spaced apart from one another as a function of the significance of device angular position information provided by the corresponding code tracks for the sensor array.

4. The sensor of claim 3 wherein:

the corresponding code tracks providing the highest significant device angular position information for the sensor array are spaced the farthest apart from one another transversely with respect to the moving direction of the code disk than any other corresponding code tracks.

5. The sensor of claim 3 wherein:

the corresponding code tracks providing the least significant device angular information for the sensor array are spaced the closest together transversely with respect to the moving direction of the code disk than any other corresponding code tracks.

6. The sensor of claim 1 wherein:

the device is a steering wheel.

7. A sensor for determining the angular position of a device, the sensor comprising:

a code disk operable to be moved in a movement direction in response to rotational movement of a device, the code disk having a digital code including at least two sets of code tracks extending along the length of the code disk, wherein corresponding code tracks of each set of code tracks are spaced apart from one another across the width of the code disk;

a sensor array adjacent to one side of the code disk and arranged across the width of the code disk for sensing the code tracks as the other side of the code disk is illuminated to determine the angular position of the device.

8. The sensor of claim 7 wherein:

the corresponding code tracks of each set of code tracks are arranged offset with one another along the length of the code disk.

9. The sensor of claim 7 wherein:

the corresponding code tracks of each set of code tracks are spaced apart from one another as a function of the significance of device angular position information provided by the corresponding code tracks for the sensor array.

10. The sensor of claim 9 wherein:

the corresponding code tracks providing the highest significant device angular position information for the sensor array are spaced the farthest apart from one another across the width of the code disk than any other corresponding code tracks.

11. The sensor of claim 9 wherein:

the corresponding code tracks providing the least significant device angular information for the sensor array are spaced the closest together across the width of the code disk than any other corresponding code tracks.

12. The sensor of claim 7 wherein:

the device is a steering wheel.

* * * * *